United States Patent [19]

Kawamoto

[11] Patent Number: 5,590,298
[45] Date of Patent: Dec. 31, 1996

[54] METHOD OF RESTORING AND UPDATING RECORDS IN A DISK CACHE SYSTEM DURING DISK DRIVE IDLE TIME USING START AND END ADDRESSES

[75] Inventor: Masakazu Kawamoto, Komae, Japan

[73] Assignee: Fujitsu Limited, Kawasaki, Japan

[21] Appl. No.: 553,822

[22] Filed: Nov. 6, 1995

Related U.S. Application Data

[63] Continuation of Ser. No. 210,774, Mar. 21, 1995, abandoned, which is a continuation of Ser. No. 647,623, Jan. 29, 1991, abandoned.

[30] Foreign Application Priority Data

Jan. 30, 1990 [JP] Japan .................... 2-18075

[51] Int. Cl.$^6$ ................ G06F 12/16; G06F 13/00; G06F 12/06
[52] U.S. Cl. .................. 395/403; 395/404; 395/440; 395/489; 395/182.04; 395/182.18; 395/183.18; 395/494; 395/419; 364/DIG. 1; 364/243.41; 364/248.1; 364/268.5; 364/264.6; 364/285; 364/944.92; 364/952.1; 364/964.2; 364/970.1; 364/DIG. 2
[58] Field of Search .................. 395/823, 419, 395/481, 483, 489, 492, 182.03, 182.04, 182.18, 183.18, 600, 403, 404, 438, 439, 440, 441, 494

[56] References Cited

U.S. PATENT DOCUMENTS

| | | | |
|---|---|---|---|
| 4,419,725 | 12/1983 | George et al. | 395/416 |
| 4,593,354 | 6/1986 | Ushiro | 395/185.01 |
| 4,638,425 | 1/1987 | Hartung | 395/460 |
| 4,827,462 | 5/1989 | Flannagan et al. | 369/32 |
| 4,916,605 | 4/1990 | Beardsley et al. | 395/489 |

FOREIGN PATENT DOCUMENTS 0066727  3/1989  Japan .

*Primary Examiner*—Glenn Gossage
*Attorney, Agent, or Firm*—Armstrong, Westerman, Hattori, McLeland & Naughton

[57] ABSTRACT

A method of restoring write data in a disk cache system includes the steps of providing a host, a disk drive having a plurality of tracks including a plurality of records, a cache memory, a nonvolatile memory storing a directory which controls storing of tracks within the nonvolatile memory, and a disk controller. The disk controller writes tracks of data from the disk drive, including records addressed by a read command sent from the host, into the cache memory. The disk controller also writes tracks of data, including records updated by the host, into the nonvolatile memory in response to a write command sent from the host, and restores the records updated by the host to the disk drive during an idle time of the disk drive. A record in the nonvolatile memory is updated in response to the write command sent from the host. A start address and an end address of a record to be restored to the disk drive from the nonvolatile memory are updated in response to an address of a record updated by the host. Restoring of the record to the disk drive from the nonvolatile memory is performed in response to receipt of the start address and the end address of the record to be restored to the disk drive from the nonvolatile memory.

6 Claims, 5 Drawing Sheets

| ENTRY NUMBER | SEQUENCE NUMBER | TRACK ADDRESS | START/END ADDRESSES | BLOCK ADDRESS | OTHER CONTROL INFORMATION |
|---|---|---|---|---|---|
| 000 | | | | | |
| 001 | | | | | |
| | | | | | |
| FFF | | | | | |

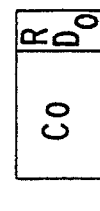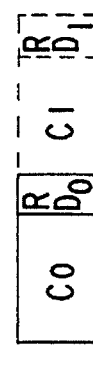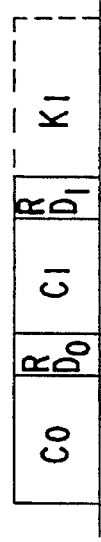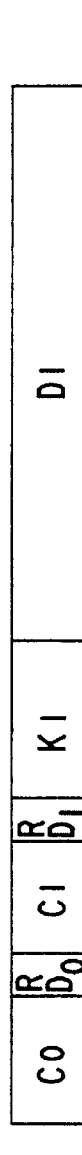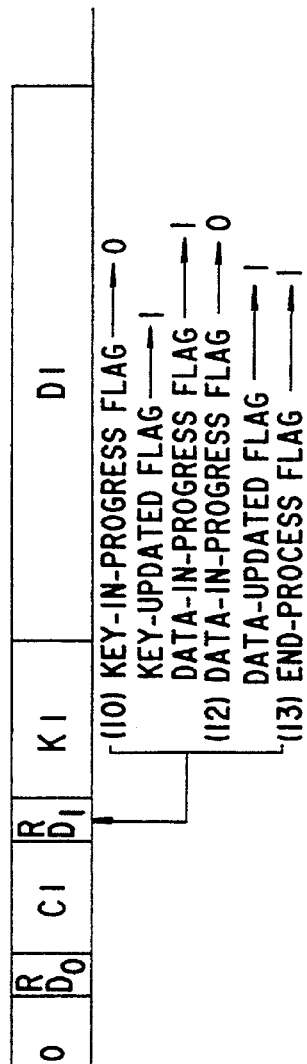
Fig.5(a) Fig.5(b) Fig.5(c) Fig.5(d)

METHOD OF RESTORING AND UPDATING RECORDS IN A DISK CACHE SYSTEM DURING DISK DRIVE IDLE TIME USING START AND END ADDRESSES

This application is a continuation of application Ser. No. 08/210,774, filed Mar. 21, 1995, now abandoned, which is a continuation of application Ser. No. 07/647,623, filed Jan. 29, 1991, also now abandoned.

BACKGROUND OF THE INVENTION

The present invention relates to a method of restoring write data in the disk cache system and particularly to a method of restoring write data in a system for realizing high speed reading/writing between host and disk drive by storing read data sent from the disk drive in a cache memory, by storing the write data sent from the host in the cache memory and a non-volatile memory, and then restoring this write data in the disk drive during the idle time of disk drive.

In the disk cache system, the cache memory which operates at a higher speed and has a lesser capacity than the disk drive is provided between host and disk drive. At the time of a read operation, the data read from the disk drive is first stored in the cache memory and the host reads the data stored on this cache memory when an adequate time is available (for instance, when other processing is not being carried out). Moreover, at the time of the write operation, the write data is first stored in the cache memory, and this write data is transferred for writing to the disk drive when adequate time is available. Thereby, the host realizes high speed write and read operations for the disk drive in the same manner as those for ordinary memory without compensating for a difference in the processing speed for the disk drive and the current operating condition of the disk drive.

Particularly, a disk drive such as magnetic disk apparatus and an optical disk apparatus takes a longer time for access due to waiting time for rotation of the disk, but is capable of compensating for such an inconvenience by employing a disk cache system.

In this disk cache system, if a read operation fails due to some errors or a power failure at the time of reading data from the disk drive, the desired data may be read through direct access to the disk drive as required. Therefore, data loss is not caused.

However, in the case of a data writing operation, if the data writing operation fails due to power down or momentary interruption of data or errors during the data writing to the disk drive, a problem that the write data is lost may be caused because the host purges the write data after it has normally completed the data writing operation.

To protect data by preventing loss of data which may be caused during data writing, a battery backup system for cache memory has been proposed, so that the data written in the cache memory is no longer lost even when power down occurs. However, the method of restoring write data through a battery backup system for the cache memory as a whole is actually difficult to introduce, because the backup battery is required to have a large capacity when the cache memory has a capacity as large as several hundreds of megabytes, such as exists in a large scale system.

In order to overcome this problem, a method of restoring write data (for instance, Japanese Laid-open Patent No. 66727/1989) has been proposed. In this case, a nonvolatile memory having the battery backup system and a smaller capacity than the cache memory is provided additionally to such cache memory, the write data is stored in the cache memory and this nonvolatile memory and the write data control information is written in the nonvolatile memory.

Thereby, even when the cache memory has a large capacity, the write data can surely be rewritten owing to the small capacity nonvolatile memory and the small size backup battery.

As a method of restoring write data in the disk cache system, the method of storing the write data in a small capacity nonvolatile memory (which is in addition to, and different from, the above-mentioned cache memory) is capable of restoring the write data by preventing loss of write data due to a power failure during the write operation to the disk drive.

However, the existing method of restoring write data has been accompanied by the disadvantage that, if write data failure is generated by data error or momentary intermission of data during data writing to the nonvolatile memory, the defective data is written back because such defective condition is not controlled.

SUMMARY OF THE INVENTION

It is therefore an object of the present invention to provide a method of restoring updated write data so that validity of write data is verified and the data is accurately rewritten during a writeback operation even when the data in the cache memory, namely the data of the nonvolatile memory is being written into the disk drive and the write data failure is caused by data error and momentary interruption of data.

This invention is a method of restoring write data in a disk cache system comprising a host, a disk drive having a plurality of tracks including a plurality of records, a cache memory, a nonvolatile memory, and a disk controller, wherein the disk controller stores tracks including records corresponding to a read command sent from the host in the cache memory from the disk drive, and also stores the tracks including the records updated by the host, into the nonvolatile memory based on the write command sent from the host, and restores the record updated by the write command to the disk drive during the idle time of the disk drive. The method includes updating of records in the nonvolatile memory based on the write command sent from the host; updating the start address and the end address of a record to be restored to the disk drive from the nonvolatile memory, which is stored in the directory within the nonvolatile memory for controlling the track stored in the nonvolatile memory, based on the address of the record updated by the host; and restoring the record updated by host to the disk drive on the basis of the start address and end address of record to be restored to the disk drive from the nonvolatile memory stored in the directory.

DETAILED DESCRIPTION OF THE PREFERRED EMBODIMENTS

Figure 1:
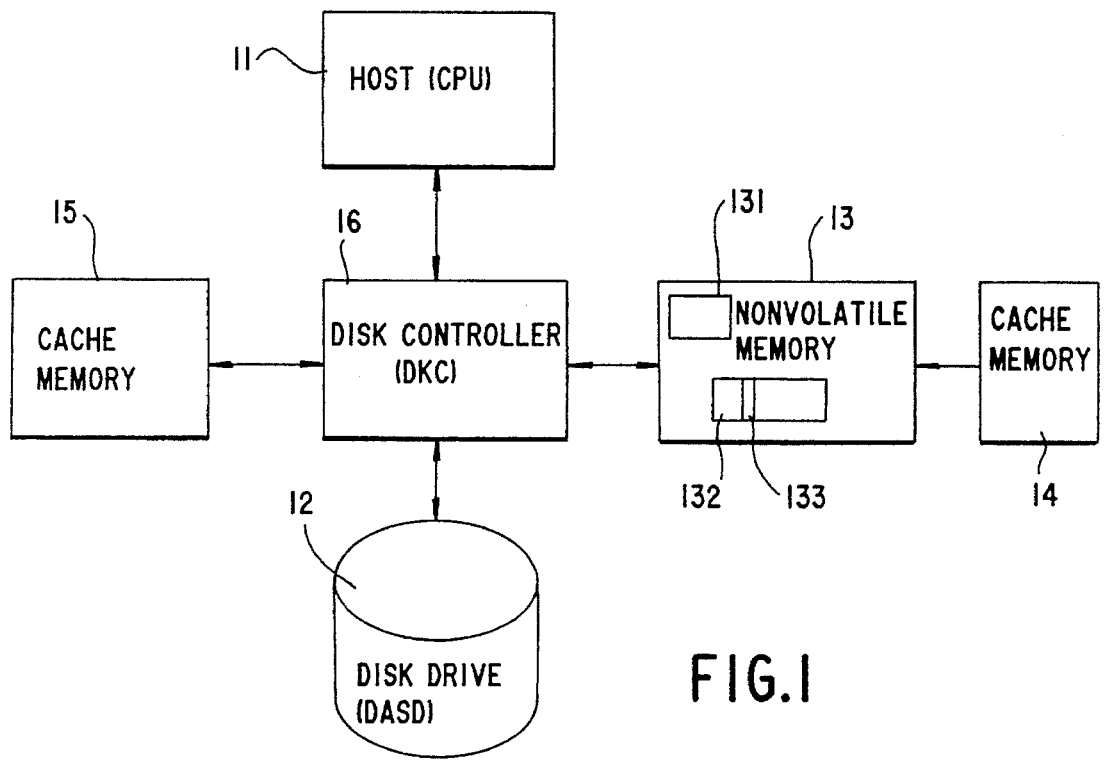
FIG. 1 is a diagram for explaining a system of the present invention.
Figure 2:
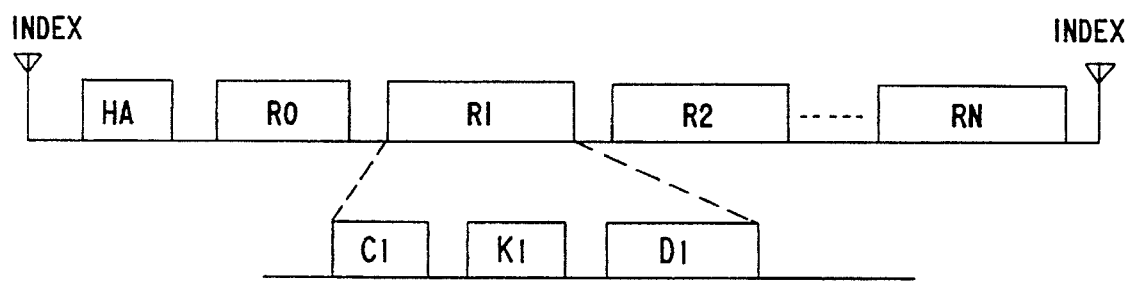
FIG. 2 is a diagram for explaining track format of disk drive.
Figures 3, 4:
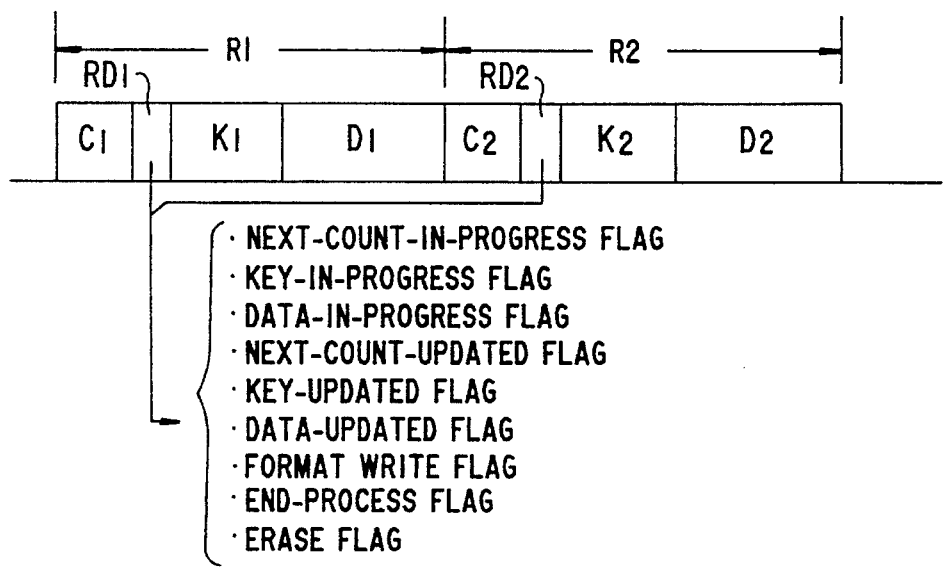
FIG. 3 is a diagram for explaining directory on a nonvolatile memory used in an embodiment of the present invention.
FIG. 4 is a diagram for explaining data format on nonvolatile memory and flag of a record descriptor used in the same embodiment of the present invention.

An embodiment of the present invention will be explained with reference to FIG. 1 to FIG. 5, A disk drive control system shown in FIG. 1 is used as a preferred embodiment of the present invention. FIG. 2 is a diagram for explaining a track format of disk drive. FIG. 3 is a diagram for explaining directory in a nonvolatile memory used in a preferred embodiment of the present invention. FIG. 4 is a diagram for explaining a data format in the nonvolatile memory and a record description used in the same embodiment of the present invention. FIG. 5 is a diagram for explaining a data writing operation in the same embodiment of the present invention.

Since the data writing operation of disk drive 12 utilizing a cache memory 15 is similar to that of the prior art, the data writing operation will mainly be explained, considering an example that the disk drive 12 is DASD such as a magnetic disk apparatus (indicated by numeral 12) and the processing unit of host data is the track unit of DASD 12.

(A) System Structure

Since the total overall structure of FIG. 1 has already been explained, only the internal structure thereof will be explained hereunder.

FIG. 2 indicates a track format for writing data into DASD 12. The track format starts with an index and terminates with an index.

HA means home address, indicating a physical position of track and normal or irregular condition of the track. R0 means the first record following the home address HA. This record is used for designating an alternative track when this record is defective.

R1 to RN following R0 are records in which data are written. Each record comprises, as the enlarged view of record R1 indicates, three areas of the count area C, key area K and data area D.

The count area C allows writing of record number, key length and data length within the track. Thereby, a size of record may be known. The key area allows writing of data which will become the index for searching the record.

The data area D allows writing of data of a user in the unit of a cell (32 bytes), including the data information determined in the count area C and key area K.

Since a number of records R1 RN is variable, the data to be written in this track format has a variable length.

FIG. 3 shows a structure of a directory 131 in the nonvolatile memory 13. In the sequence number area, the sequence number for updating of the directory is written. The sequence number is also updated for each update of directory information. The directory 131 has a copy (not illustrated in FIG. 1) for restoring of directory information and control of the condition thereof. The directory, updated directory and copy directory are respectively given the sequence numbers which may be assigned. In this embodiment, the copy of directory is given odd numbers such as 1, 3, 5, . . . N, while the original directory is given even numbers such as 0,2, 4, 6, . . . , N+1. The function and effect of the sequence numbers will be explained in the following paragraph for explaining the operations.

The track address area allows writing of the device number of the DASD, the cylinder number indicating the address of the real DASD of a head and track address.

The start/end area allows writing of two pairs of start position s and end position e of records storing the data as the memory address in the nonvolatile memory 13. The function and effect of the two pairs of start/end data s1, e1 and s2, e2 will be explained in the next paragraph for explaining the operation.

The block address area allows writing of the address of a block to which the data is stored as the memory address in the nonvolatile memory 13. Each data in the track is divided into a plurality of blocks and each block is distributed in the memory for enhancing the application efficiency of memory. Instead, one logical block is considered herein in order to simplify the explanation.

The remaining area allows writing of other control information. Such directory information is written in each track, and numerals 000, 001, etc. at the left end side refers to the entry numbers of the directory.

FIG. 4 shows a data format to be written on the nonvolatile memory 13, indicating data of a record R1 and a record R2. The count area C1, key area K1 and data area D1 indicate data of the record R1, while the count area C2, key area K2 and data area D2 indicate data of the record R2. The gap like track format of the DASD 12 does not exist between the areas.

RD (RD1, RD2, etc.) is the record descriptor 133 consisting of two bytes. This descriptor is provided after the count area C and allows writing of record information indicated in the figure.

Namely, as the next count in progress flag, 1 is set when the count area C of the next record is being updated. As the key-in progress flag, 1 is set when the key area K is being updated.

As the next count updated flag, 1 is set when the count area C of the next record is updated. As the key updated flag, 1 is set when the key area K is updated. As the data updated flag, 1 is set when the key area K is updated.

The format write is a flag indicating whether the data format is updated or not. For this format write flag, 1 is set when the format is rewritten as by the write command CKD.

The end process flag is a flag indicating the temporary end of the processing. As this end process, 1 is set when the data writing process temporarily terminates.

As the record information flag, "erase" is moveover provided in this embodiment. As the erase flag, 1 is set when the erase command is issued from the host 11, indicating that the remaining tracks including such record have been erased.

(B) Operation of Embodiment

The write operations of this embodiment will be explained in accordance with the processing sequence with reference to FIG. 2 to FIG. 5, considering an example of write operations by write command CKD as the ordinary write operation. Each following process step is carried out by command DKC 16, unless otherwise designated. The write operation of data to nonvolatile memory 13 is carried out in parallel with the writing to the cache memory 15. But, since the write operation to the cache memory 14 is conducted in the same way as the prior art, explanation about such write operation will not be repeated here.

Moreover, the entry address and track address of directory are defined as the same address as 000.

1. Initialization of directory

In case the nonvolatile memory 13 is used, when there is no valid data of a relevant track on the nonvolatile memory 13, the directory 131 is initialized by writing an invalid pattern to the sequence number, track address and start/end positions of the directory 131.

After initialization of the directory 131, the write processing of the following host data is carried out.

2. When the data is written into the DASD 12 from the host 11, positioning of the record is carried out on the cache memory 15 to detect a record position to store the write data. Here, the positioning record is considered as R0.

3. Data writing is carried out in the form of updating the contents of the record. Therefore, the data of the count area C0, namely the data of the count part of the positioning record R0 on the cache memory 15 is copied in the data area 132 of the nonvolatile memory 13 (FIG. 5(a)).

4. In case the write command issued from host 11 is the write command CKD for updating the track format, the record (R1) of data to be written next to the positioning record R0 is added.

Moreover, the sequence number (SC0) is written into the sequence number area of entry (000) of the directory 131 and the sequence number (SC1 of odd number is larger by 0 than SC1) is written into the directory (not illustrated) of the copy of such sequence number.

5. Since the data of the count area is written as the data of record R1, the next count-in progress flag is set to 1 in the record descriptor RD0 of the count area C0 of the positioning record R0 (FIG. 5(b)).

Thereby, it is indicated that the count part of the next record R1 is being updated.

6. As the start position, the memory address position (s2) of the positioning record R0 is set to the start/end area of the directory 131.

7. The updated data of count part is written in the count area C1 of the record R1. Simultaneously, the key-in progress flag of record descriptor RD1 of the record R1 is set to 1.

8. When writing to the count area C1 terminates, the next count-in progress flag of the record descriptor RD0 of the position record R0 is reset to 0, and the next count updated flag is set to 1 in the record descriptor RD0 (FIG. 5(c)).

Thereby, it is indicated that the count part of the next record R1 is updated.

As explained above, when the count part of the record R1 is being updated, the next count-in progress flag is set to 1 in the record descriptor RD0 of the preceding record R0. When the update processing of the count part of record R1 terminates, the next count-in progress flag is reset and the next count updated flag is set to 1. Thereby, when the next count-in progress flag is 1 and the next count updated flag is 0, it can be detected that the update processing of the count part of record R1 is interrupted for some reason. Moreover, when the next count updated flag is 1, it can be detected that the update processing of count part of record R1 terminates normally. These can be applied to the update processing of the key part and the data part which will be explained next.

9. When writing to the count area C1 of record R1 terminates, the key data is written in the key area K1 of the record R1, updating the key area.

10. When writing of the key data to the key area K1 terminates, the key-in progress flag is reset to 0 in the record descriptor RD1 of record R1, and the key updated flag is in turn set to 1, and the data-in progress is set to 1. Thereby, it is indicated that the update processing of the key area of record R1 terminated normally.

11. When writing to the key area K1 of the record R1 terminates, data is written into the data area D1 of the record R1, updating the data area.

12. When data writing to the data area D1 terminates, the data-in progress flag of the record descriptor RD1 of the record R1 is reset to 0, and the end process flag of the same record descriptor RD1 is set to 1 (FIG. 5(d)).

Moreover, the end position (e2) is set to the start/end area of the directory 131. Thereby, it is indicated that the update processing of the data area of the record R1 and the update processing of the record R1 terminated normally.

13. In case of plurality of records are provided for data writing, the write CKD command is issued from host.

14. Upon reception of this write CKD, the write processing of record 2 is executed following the writing to record R1 by considering the record descriptor RD1 of count area of record R1 to which data is written in the step 7 as the positioning record and then repeating the steps from 4 to 12 after resetting the end process flag of the record descriptor RD1 of record R1 to 0. Thereafter, such processing is repeated.

Figures 5E, 5F:
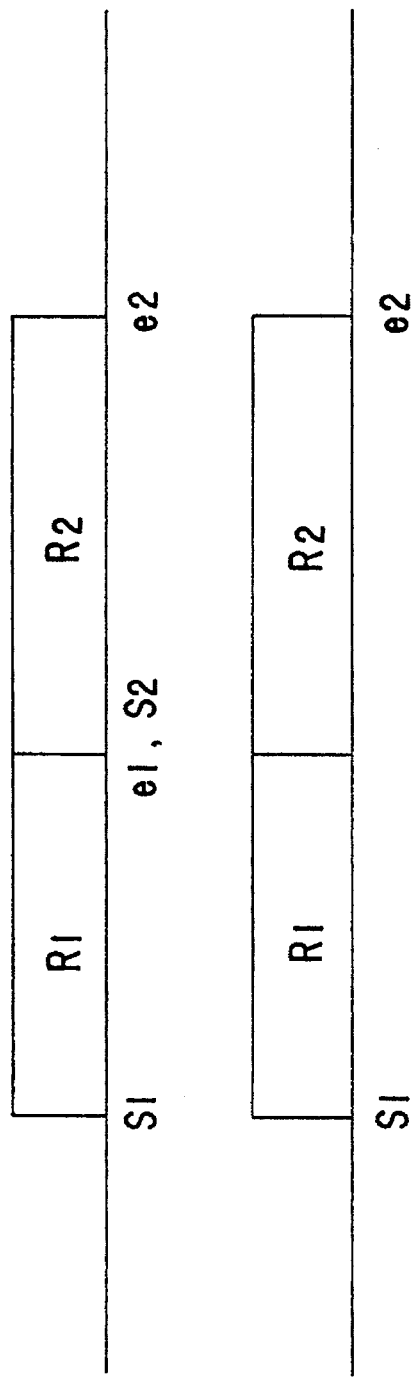
FIG. 5 is a diagram for explaining data writing operation in the same embodiment of the present invention.

15. Moreover, the processing for updating the start/end position of directory 131 is carried out. If data is written in the record R2 after the record R1, s1/e1 indicating the start/end position of the preceding record R1 and the start position s2 of the current record R2 are set in the start/end area of directory 131 during the writing processing of record R2. When the write processing of record R2 terminates normally, as shown in FIG. 5(e), the start/end positions s1/e1 and s2/e2 of the records R1 and R2 are set.

Since the start/end position indicates the memory address of data written normally, when the writing operation of the records R1 and R2 terminate normally, the end position e1 of the record R1 and the start position s2 of the record R2 are unnecessary.

Therefore, when the write processing of the record R2 terminates normally, in regard to the start/end positions s1/e1 and s2/e2 of the records R1 and R2, the preceding s1/e1 is updated by the s1/e2 which indicates the start/end position of the records R1 and R2 as a whole. In the same manner, the start/end position of the directory 131 is updated for each termination of write processing of a new record by the write CKD.

As explained above, the writing processing of the record and update of start/end position of the directory 131 realizes detection of records in which the write processing has terminated normally even when the write processing of a plurality of records are interrupted and prevents erroneous writeback because the terminated record position can be identified.

For instance, setting of s1/e2 to the start/end position determines that both record data are valid since the write processing of records R1 and R2 terminated normally. If s1/e1 and s2 are set to the start/end position but e2 which indicates end position of record R2, is not set, it is detected that the processing is interrupted during write processing of the record R2 and is it determined that the record R1 is valid, but that the record R2 and the subsequent records are invalid.

16. When all update processing of directory information of entry (000) of directory 131 are terminated, the directory information of entry (000) is copied to the copied directory.

In this case, the sequence number of entry (000) of copied directory is set to the odd number SC1 which is larger by 1 than the sequence number SC0 of the original directory.

18. When it is requested to update contents of a track to which the records R1 and R2 are written by writing another data thereto, the processing steps in the above-numbered paragraphs 3 to 15 are repeated and the writing operation of new data is executed to the entry (000) of directory.

19. In this case, the sequence number of the directory 131 is updated to the next number (SC2) which is larger than preceding sequence number SC0.

20. When the update processing of data of entry (000) of the track and update processing of directory 131 terminate, the directory information is copied to the copied directory (not illustrated), and the sequence number of entry 000 of the copied directory is updated to the odd number SC3 which is larger by 1 than the sequence number SC2 of the original track.

As explained above, it can be checked whether the update process of directory for the relevant track has been conducted normally or not by detecting an abnormal interruption of update operations of the directory by giving sequence numbers which may be discriminated easily as to the directory information and copied directory information and thereby writeback by an erroneous directory can be prevented.

For example, when the sequence number of the original directory is SC2 and that of the copied directory is SC1 (the sequence number of the copied directory is younger), it is detected that the processing is interrupted during an update of the copied directory data of sequence number SC2, and the data of copied directory is decided as invalid data. Meanwhile, when the sequence number of copied directory is SC3 (the sequence number of copied directory is older), normal termination of the update process of the directory is detected, and data of the directory is determined to be valid data.

22. As explained above, when the predetermined data writing operation for the cache memory 15 and nonvolatile memory 13 terminate, DKC 16 transfers the data written to the nonvolatile memory 13 to DASD in the adequate timing where any processing is not carried out for writeback to the predetermined address position designated by the directory 131.

At the time of writeback, validity of data of relevant track as a whole is decided as explained above by comparing the sequence numbers of the directory and its copied directory.

When the track processing is momentarily suspended, it can be decided, as explained above, from which record the interrupted processing is started again by s1/e1 and s2 on the directory. Therefore, the interrupted record may be detected by sequentially searching the record descriptor. Moreover, for the invalid records, the effective part of count, key and data of the records may be decided, as explained above, by observing the in progress flag and updated flag of record descriptor of the count part.

As explained previously, the writeback to DASD 12 may be executed only to the effective data by accurately deciding validity of data on the nonvolatile memory 13.

Figure 6:
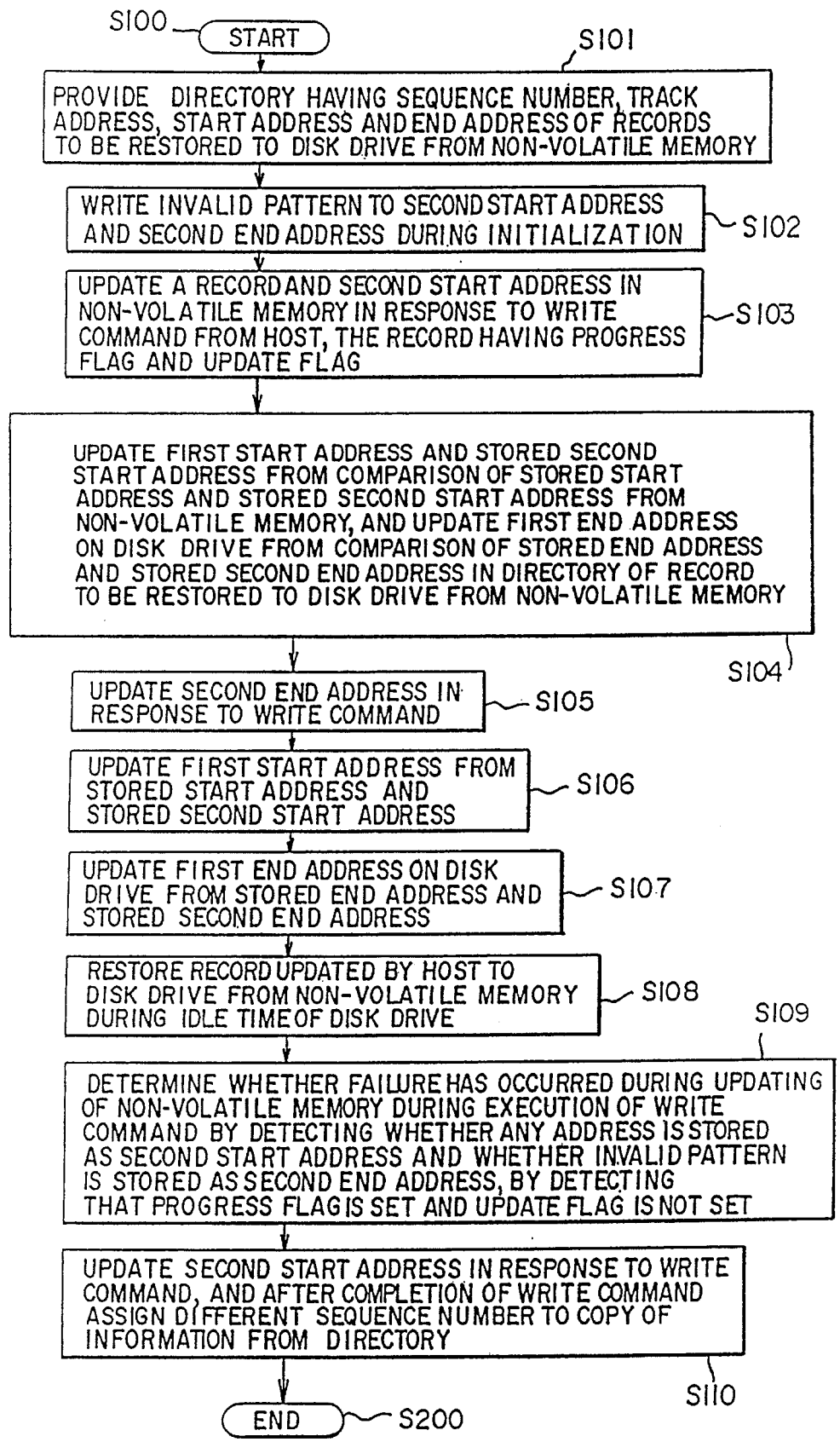
FIG. 6 is a flow chart for explaining steps performed in the present invention.

The flowchart of FIG. 6 illustrates the steps of a method of restoring write data in a disk cache system according to the present invention. Specifically, step S100 is a start of the flowchart. Step S101 provides a directory having a sequence number, track address, start address and end address of the records to be restored to the disk drive from the non-volatile memory. In step S102, an invalid pattern is written to the second start address and the second end address during initialization. In step S103, updating of a record and a second start address occurs in non-volatile memory in response to a write command from the host. In this step, it is noted that the record has a progress flag and an update flag. In step S104, updating of the first start address occurs from comparison of a stored first start address and the stored second start address from the non-volatile memory, and updating of the first end address on the disk drive occurs from comparison of a stored first end address and the stored second end address in the directory of the record to be restored to the disk drive from the non-volatile memory. In step S105, updating of the second end address occurs in response to the write command. In step S106, updating of the first start address occurs from the stored first start address and the stored second start address. In step S107, updating of the first end address occurs on the disk drive from the stored first end address and the stored second end address. In step S108, restoration occurs of the record updated by the host to the disk drive from the non-volatile memory during an idle time of the disk drive. In step S109, it is determined whether failure has occurred during the updating of the non-volatile memory during execution of the write command by detecting whether any address is stored as the second start address and whether an invalid pattern is stored as the second end address, by detecting that the progress flag is set and the update flag is not set. In step S110, updating occurs of the second start address occurs in response to the write command, and after completion of the write command, a different sequence number is assigned to a copy of information from the directory. The method of FIG. 6 ends at step S200.

A preferred embodiment of the present invention has been explained above, but the present invention is not limited only to this embodiment and various pieces of information other than those indicated for this embodiment may be considered as the directory information and record information.

The present invention will provide following effects as explained above.

(1) Since data to be written into the cache memory 15 is written into the nonvolatile memory 13 and the directory information which is the control information of such write data for each processing information of host data are also written into the nonvolatile memory 13, validity of data written into the cache memory 15 and nonvolatile memory 13 can be accurately decided, including the data of variable length data format.

(2) When failure or interruption of write data is generated by error or power failure during data writing to nonvolatile memory, as well as the writing of data on the nonvolatile memory to the disk drive, validity of data is determined in detail and the data during writeback is accurately protected, and thereby writeback of invalid data can be prevented.

We claim:

1. A method of restoring write data in a disk cache system comprising the steps of:

providing a host, a disk drive having a plurality of tracks including a plurality of records, a cache memory, a nonvolatile memory storing a directory which controls storing of tracks in said nonvolatile memory, and a disk controller; wherein said disk controller writes tracks of data from said disk drive, including records addressed by a read command sent from said host, into said cache memory, and said disk controller also writes tracks of data, including records updated by said host, into said nonvolatile memory in response to a write command sent from said host and restores the records updated by said host to said disk drive during an idle time of said disk drive;

updating, in said nonvolatile memory, one of said records in response to said write command sent from said host;

updating, in said directory, a start address and an end address of said one of said records to be restored to said disk drive from said nonvolatile memory in response to an address of said one of said records updated by said host; and restoring said one of said records updated by said host to said disk drive from said nonvolatile memory during said idle time of said disk drive in response to a write command sent from said host containing said start address and said end address of said one of said records to be restored to said disk drive from said nonvolatile memory.

2. A method of restoring write data according to claim 1, wherein the step of providing said nonvolatile memory storing said directory further comprises storing in said directory as directory information, (a) a sequence number for updating of said directory;

(b) an address of one of said plurality of tracks of said disk drive; and (c) a start address and an end address of said one of said records to be restored to said disk drive from said nonvolatile memory.

3. A method of restoring write data according to claim 1, said method further comprising, after completion of said write command, a step of providing a copy of information from said directory stored in said nonvolatile memory and assigning a sequence number to that copy of information different from an original sequence number assigned to said information from said directory stored in said nonvolatile memory so as to serve to discriminate said information from said directory stored in said nonvolatile memory and said copy of said information from said directory.

4. A method of restoring write data according to claim 1, wherein said directory stores a range of records to be restored to said disk drive from said nonvolatile memory beginning at a first start address for said range of records and ending at a first end address for said range of records, and said directory also stores said range of records in response to said write command sent from said host beginning at a second start address for said range of records and ending at a second end address for said range of records; said method further comprising the steps of:

writing an invalid pattern to said second start address and said second end address during initialization; updating said second start address in said nonvolatile memory in response to said write command; updating said second end address in response to said write command after updating said one of said records in said nonvolatile memory; and updating on said disk drive, after updating said second end address, said first start address from comparison of the stored first start address and the second start address stored in said nonvolatile memory, and also updating said first end address on said disk drive from comparison of the stored first end address and the second end address stored in said nonvolatile memory.

5. A method of restoring write data according to claim 4, said method further comprising the steps of determining whether a failure has occurred during updating of said nonvolatile memory during execution of said write command, by detecting whether any address is stored as said second start address and whether said invalid pattern is stored as said second end address.

6. A method of restoring write data according to claim 5, wherein each record stored in said nonvolatile memory respectively includes as record information:

(i) a progress flag for indicating that a respective record is being updated;

(ii) an update flag for indicating that the respective record has been updated;

said method further comprising a step of determining whether a failure has occurred during updating of said nonvolatile memory by detecting that said progress flag is set and said update flag is still not set.

* * * * *